Figure 1:
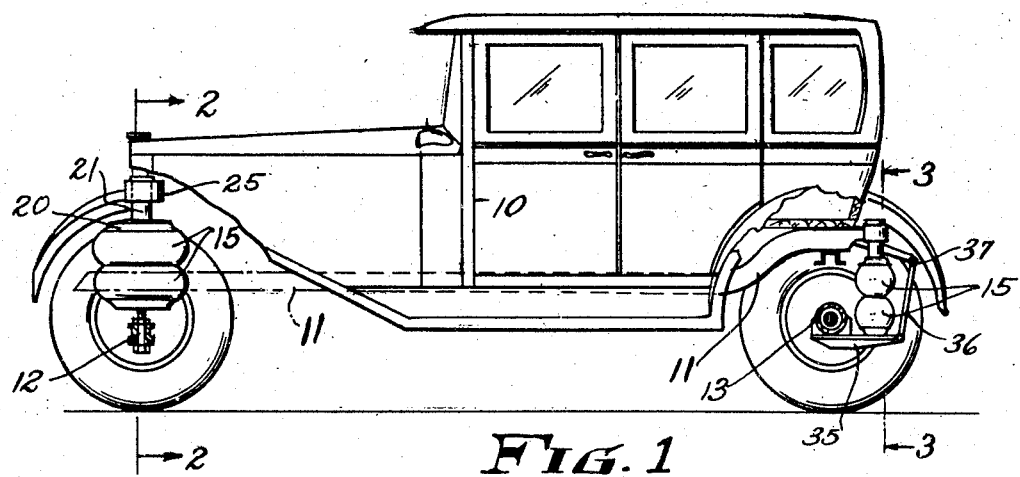

Oct. 16, 1934.  A. E. FORSYTH  1,977,547
VEHICLE SUSPENSION
Filed Nov. 9, 1931  3 Sheets-Sheet 1

Inventor
Albert E. Forsyth
By Bates, Golrick & Jeare Attorney

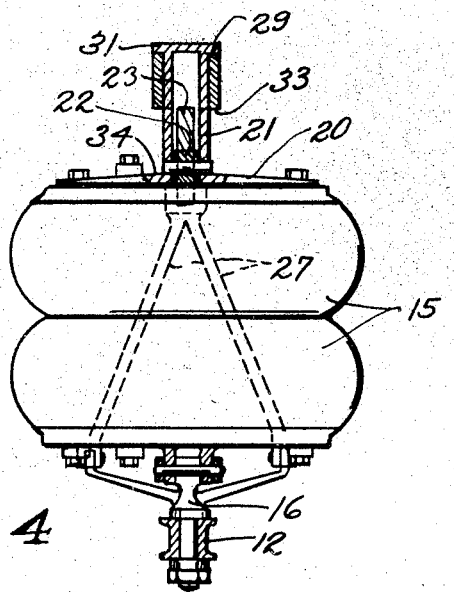
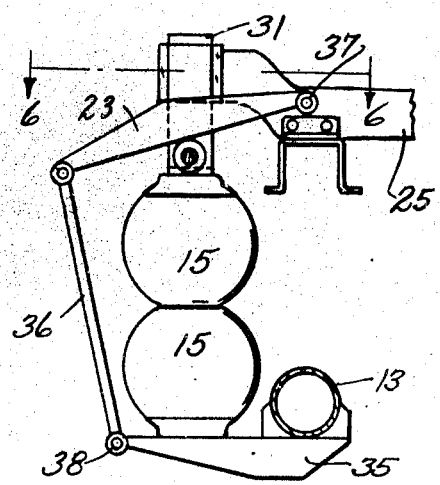
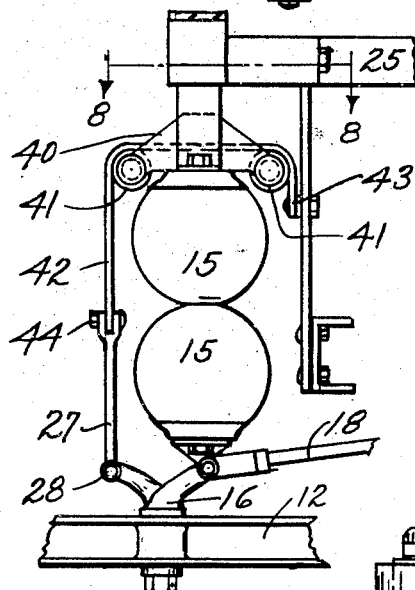
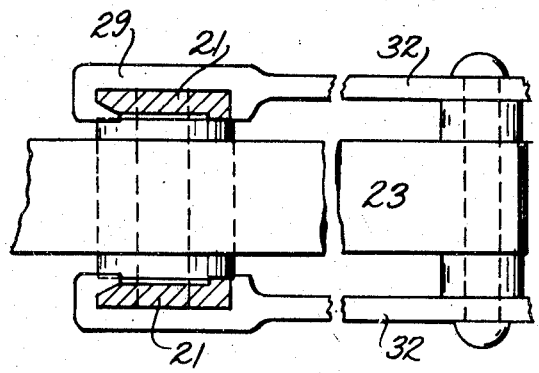
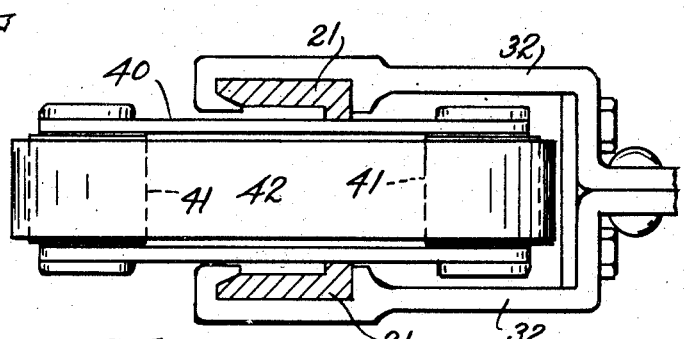
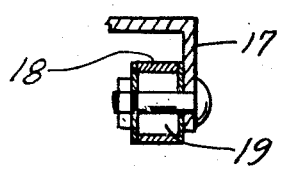

Patented Oct. 16, 1934

1,977,547

UNITED STATES PATENT OFFICE 1,977,547

VEHICLE SUSPENSION

Albert E. Forsyth, Ottawa, Ontario, Canada, assignor to Forsyth Automotive Pneumatic Spring Limited, Ottawa, Ontario, Canada, a corporation of Canada Application November 9, 1931, Serial No. 573,814

16 Claims. (Cl. 267—15)

This invention relates to pneumatic spring suspension devices, and particularly to those which are adapted for use in connection with the operation of motor vehicles. Such devices are used in lieu of springs, and are intended to minimize the vibrations that are transmitted to the body of the vehicle, while it is traveling at a high rate of speed over an uneven road. Pneumatic devices have heretofore, been used for this purpose, but in every instance that has been brought to my attention, the bottom or lower portion of the device is supported upon the axle or housing, while the body rests directly upon the upper part of the device. To obtain the necessary degree of spring range however, and yet to keep the height of the vehicle body within reasonable low limits, there is not sufficient space between the axle and chassis frame to install the pneumatic elements. This is particularly noticeable on relatively heavy vehicles where the pneumatic element must be fairly large to support the weight without increasing the pressure within the element to an objectionable degree.

Where pneumatic elements are arranged in pairs and in superimposed relationship with one element acting directly against the other, considerable vertical movement of the axle is permitted without corresponding movement of the body. This is particularly noticeable where the pneumatic elements comprise inter-engaging ellipsoidal elements, for I have found that such elements may be compressed substantially one-third of their diameters before the volume is substantially diminished. Such characteristic prevents the vibratory movement of the axles being transmitted to the vehicle body, while the vehicle is moving along the average road.

An object of the present invention therefore, is to increase the riding qualities incident to the use of pneumatic spring suspension elements, and at the same time to permit the use of such elements on all motor vehicles, regardless of the weight thereof, and without increasing the height of the vehicle to an objectionable degree above the ground. A further object of my invention is to provide pneumatic spring suspension elements, which will not only replace the usual spring suspension, but which will at the same time increase the resistance to the recoil movement, and thereby enable the pneumatic elements to function as shock absorbers in addition to that of suspending the load above the axles.

I carry out my object preferably by utilizing pairs of pneumatic elements in superimposed relationship and in the positions usually occupied by the vehicle springs. The lower elements are carried by the axle or housing therefor, while a movable connection between the axle or housing, and the chassis frame engages the upper element. The body therefore, instead of resting directly upon the elements is supported by a connection which in turn is carried by the elements. Such connection may take the form of an articulated system of linkage, or may embody a flexible member that extends over guide sheaves. Thus, the ratio of vertical movement between the axle and frame may be varied in accordance with the character and arrangement of connection employed.

Figure 2:
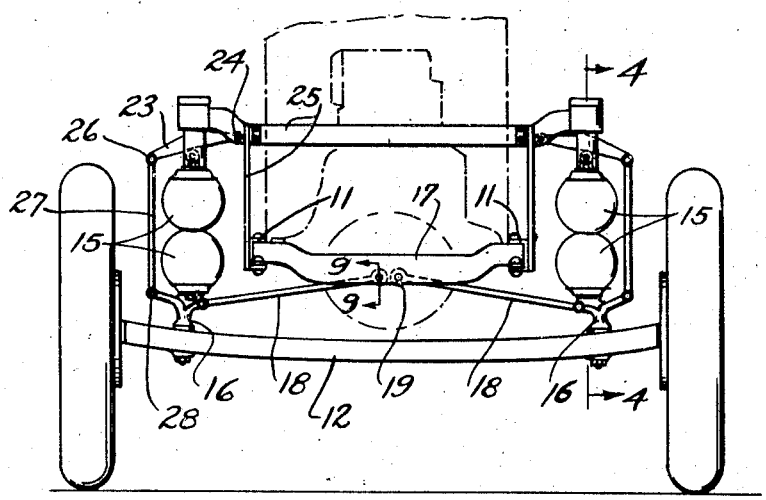
Figure 10:
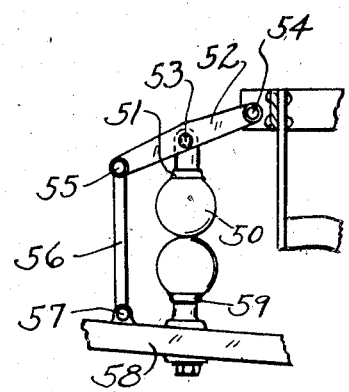
Figure 3:
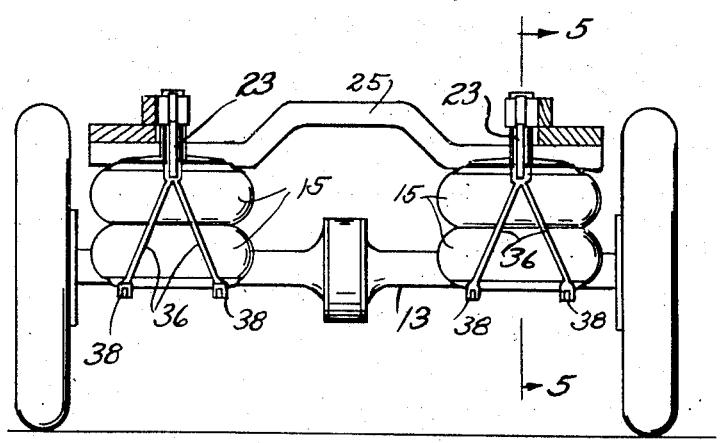
Figure 11:
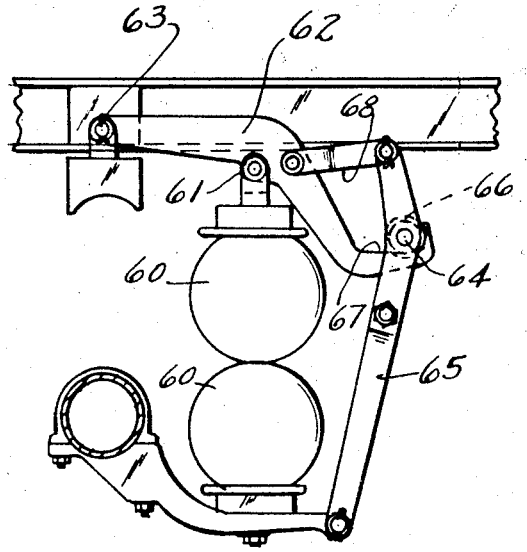
Figure 12:
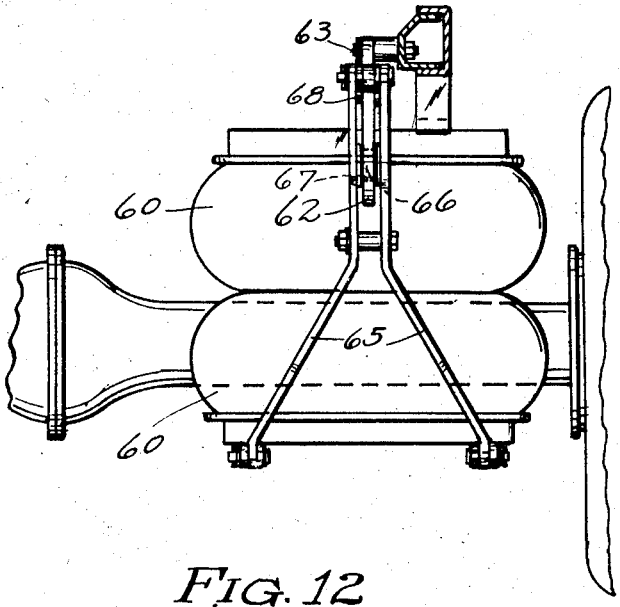
Figure 13:
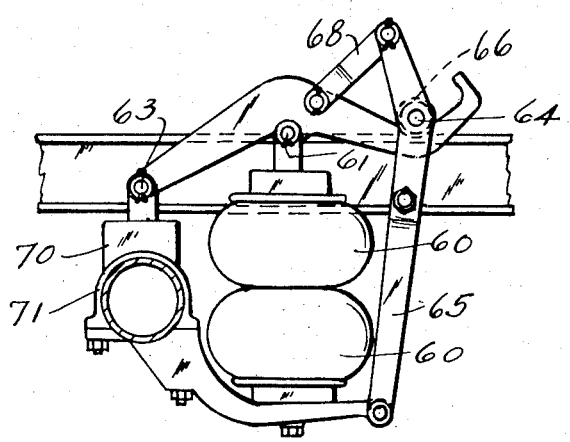

Referring now to the drawings, Fig. 1 is a side elevation of a motor vehicle embodying my invention; Fig. 2 is a front elevation with the radiator removed to show the suspension mechanism; Fig. 3 is a section taken on the line 3—3 in Fig. 1; Fig. 4 is a section taken on the line 4—4 in Fig. 2; Fig. 5 is a section taken on the line 5—5 in Fig. 3; Fig. 6 is a section taken on the line 6—6 in Fig. 5; Fig. 7 is a front elevation of a modified form of my invention; Fig. 8 is a section taken on the line 8—8 in Fig. 7; Fig. 9 is a section taken on the line 9—9 in Fig. 2; Fig. 10 is an end elevation of another modification of my invention; Fig. 11 is a side elevation adjacent the rear axle of a further modified form of my invention; Fig. 12 is an end elevation of the form shown in Fig. 11, and Fig. 13 is a side elevation illustrating the position of the mechanism of Fig. 11 in an extreme position of movement of the axle toward the frame.

My invention is shown in connection with a motor vehicle, wherein the body is indicated at 10, the chassis frame at 11, the front axle at 12 and the rear axle housing at 13. The suspension means comprises pneumatic elements 15, which are arranged in pairs and in vertical superimposed relationship. The pneumatic elements adjacent the front of the vehicle are preferably supported on the front axle through brackets 16, which in turn are connected to the cross members 17 of the frame by tie rods 18. Resilient bushings 19, as shown in Fig. 9 permit slight vertical movement of the axle with reference to the frame, and yet enable the tie rods to hold the axle in proper lateral position. Other tie rods (not shown) maintain the axle in the proper longitudinal position with reference to the frame so that the axle may be restricted to vertical movement with reference to the frame.

One form of connection between the frame and axle is shown in Fig. 1, wherein the upper pneumatic element of each pair is supported within a seat 20, which preferably carries a U-shaped bracket or extension 21. The bracket extends upwardly from the midportion of the seat, and provides a support for a roller 22, and a guideway for a lever 23. Such lever is shown as being pivotally connected at one end, as at 24, to an extension 25 of the frame, and as being pivotally connected at the other end, as at 26, to a link 27. The intermediate portion of the lever bears against the roller, and the lower portion of the link is pivotally connected at 28, to the bracket 16. Thus, the weight of the vehicle is supported on the connection with extends across the pneumatic elements.

The pneumatic elements are guided in their vertical movement by arms 32, which are rigidly connected to the frame extension 25, and which extend laterally therefrom and embrace the vertical portions of the seat extension 21. This permits the extension to slide vertically, whenever the elements are compressed or expanded. Such vertical movement is limited in one direction by contact between the bottom edge 33 of the arms with the upper surface 34 of the spring seat, while movement in the opposite direction is limited by contact between the top edge 29 of the arms 32 with a shoulder 31 on the extension.

With this arrangement, any vibrations that are imparted to the axle due to unevenness of the road are transmitted to the pneumatic elements and also through the links to the weight supporting lever 23. The pneumatic elements may be compressed and expanded however with such rapidity that the axle may be moved upwardly to compress the elements, and thence downwardly under the expansive force of the compressed air therein before the momentum of inertia of the body is overcome. If the wheels should drop into an unusual depression in the road, the pneumatic elements will act on the rebound as a shock absorber, and thus eliminate the necessity for the use of shock absorbers, as is customary at the present time with springs.

The construction adjacent the rear part of the vehicle is substantially the same as that described for the front, except for the fact that the elements are mounted upon a pad 35 that extends rearwardly from the axle housing 13. A further characteristic of the rear suspension is the fact that the link connection between the lever 23 and the lower pad 35 embodies a member 36 that is pivotally connected to the lever at 37, and to the pad at spaced points 38. Such connection therefore, assists materially in preventing lateral motion of the rear axle with reference to the frame, while the usual torque rods maintain the rear axle in proper position longitudinally of the frame.

A modification of my invention is shown in Figs. 7 and 8, wherein the lever 23 is replaced by a channel shaped bracket 40, which carries guide sheaves 41 over which a flexible cable or strap 42 may extend. One end of the strap is connected at 43 to the frame extension, while the other end is connected at 44 to the link 27.

A further modification of my invention is shown in Fig. 10 wherein the upper pneumatic element 50 may be pivotally connected through its seat 51 to a lever 52 at 53. Such lever in turn, is shown as being pivotally connected at 54 to the frame, and at 55 to the link 56. The lower end of the link, in turn, may be pivotally connected at 57 to a member 58, which is shown as being rigid with a seat 59 for the lower pneumatic element.

In Figs. 11, 12 and 13, I have illustrated another modified form, which utilizes to some extent the principle illustrated in Fig. 10, in that the upper pneumatic element 60 may be pivotally connected at 61 to the arm 62. One end of such arm is illustrated as being connected at 63 to the frame, while the other end has a moving pivot connection at 64 with the arm 65. Such moving or floating pivot takes the form of a roller 66, which may be carried by the arm 65, and may be engaged by an inclined surface 67 adjacent the outer end of the arm 62. For stabilizing purposes and for insuring that the pivot 66 traverses the cam surface 67, the upper end of the arm 65 may be pivotally connected to the arm 62 by a link 68.

The normal position of the elements is indicated in Fig. 11, in which relationship, the roller is near the outer end of the trackway 67. In Fig. 13 however, I have shown the relative position of the parts, when the elements have been compressed to the extreme position, and when the frame buffing block 70 is in contact with the axle housing 71. At such time, the roller 66 is adjacent the inner end of the trackway, so that during the recoil action, the elements must move the trackway and roller with reference to each other. The force tending to separate the numbers is thus applied through the lever 62 to the vehicle frame. The lever has its fulcrum point at 64, its force point at 61, and its load point at 63. In the position shown in Fig. 11, the leverage is greater than in the position shown in Fig. 13, for the leverage is the ratio of the length of the horizontal component of the force arms 61—64 to the length of the horizontal component of the load arms 63—64. Thus, in changing the position from that of Fig. 13 to that of Fig. 11, which is the recoil, the leverage progressively increases. Such movement is in effect, a compound action for the upper end of the member 65 is forced outwardly, while the trackway member is moved upwardly and inwardly. Thus, by varying the angle of inclination of the trackway, the resistance to the recoil movement may be selectively controlled. In this way, the pneumatic elements function jointly, as load suspension devices, and as shock absorbers.

An advantage of my invention is the fact that the movable connection between the body and the pneumatic device facilitates flexing of the device, and thereby materially increases the riding qualities. Furthermore, the arrangement increases the spring range and permits the use of the pneumatic elements on exceptionally heavy vehicles.

I claim:

1. In combination, two members adapted to be moved toward and away from each other, a pneumatic suspension device between said members and comprising the sole load supporting connection therebetween, said device being relatively fixed to one of the members, and being movably connected to the other of said members, said device comprising two inflatable bodies having contiguous convex surfaces.

2. In combination, two members adapted to be moved toward and away from each other, a movable connection between said members, and a pneumatic device supported on one of the members, and operatively engaging said connection to support the other of said members, said device comprising a pair of superimposed inflatable bodies having contiguous convex surfaces and comprising the sole load supporting connection between the members.

3. In combination, two members adapted to be moved toward and away from each other, an articulated connection between the members including two links having a shiftable pivotal connection therebetween, and a pneumatic suspension device mounted on one of the members, and comprising two interengaging load supporting members and adapted to engage one of said links for supporting one member with reference to the other.

4. In combination, two members adapted to be moved toward and away from each other, a plurality of links connecting the members and a pneumatic suspension device supported on one of the members and operatively engaging one of the links to support the other member, said device comprising a pair of superimposed inflatable bodies, unrestricted at their point of contact and providing the sole load bearing connection between the members.

5. In combination, two members adapted to be moved toward and away from each other, flexible means operatively connecting the members, and a pneumatic suspension device mounted on one of the members, and operatively engaging said means to support the other of said members, said suspension device comprising a pair of superimposed inflatable bodies having contiguous convex surfaces and providing the sole load bearing connection between the members.

6. In combination, a vehicle body, an axle therefor, a pneumatic suspension device mounted upon said axle, said device comprising a pair of superimposed inflatable bodies having contiguous surfaces, an arm pivotally mounted upon the body, and bearing against the suspension device, and means pivotally connecting the arm beyond the device to the axle, said device comprising the sole load supporting connection between the body and axle.

7. In combination, two members adapted to be moved toward and away from each other, and a pneumatic suspension device operative between said members, said device being rigidly connected to one of said members and movably connected to the other of said members, said movable connection including means for progressively increasing the resistance to the recoil movement of said device.

8. In a vehicle, the combination with an axle member and a frame member, of a pneumatic suspension device operative therebetween, including an arm pivotally connected to one of said members, and to said device, and means for movably connecting the arm along a trackway to the other of said members.

9. In a motor vehicle, the combination with a frame member, of an axle member, a plurality of inflatable elements operative between said members in superimposed load bearing relationship, means for rigidly supporting one of said elements on the axle member, an arm having an intermediate pivotal connection with the upper element, said arm having one end thereof pivotally connected to the frame member, a roller adapted to engage the other end of said arm, a link for supporting the roller, said link being pivotally connected to the axle member, and a second link connecting the first named link to the arm at a point above the roller.

10. In a motor vehicle, a frame member, an axle member, a pneumatic suspension device operative therebetween, and a pair of arms for providing an operative connection between the device and members, one of said arms extending upwardly, and the other of said arms extending laterally of said device, the upper end of the upwardly extending arm being pivotally connected through a link to the intermediate part of the laterally extending arm, and the laterally extending arm having a rolling connection with an intermediate part of the upwardly extending arm.

11. In a motor vehicle, an axle member, a frame member, a pneumatic suspension device operative therebetween, including two arms for providing an operative connection between the members and the device, one of said arms having a cam for coacting with the other of said arms to increase the recoil resistance of said device.

12. In a motor vehicle, the combination of a frame member, an axle member, a pneumatic suspension device operative therebetween, two arms providing an operative connection between the device and members, said arms having a three point articulated connection with each other, two of said points being relatively fixed pivots, and third being a relatively movable pivot, and the movable pivot comprising a roller carried by one of the arms and a trackway for the roller carried by the other arm.

13. In combination, two members movable toward and away from each other, a shock absorbing device suspended operatively between the two members, and means for connecting the device to the members comprising two links pivotally connected at their fixed ends to the members respectively, the free ends of said links having a floating pivotal connection with each other, the device being connected to one of the links at an intermediate point thereon and means to vary the effective lever arm between said floating pivot and the fixed end of one of the links, said means being actuated by movement of the members toward or away from each other, whereby the lever arm is shortened as the members approach each other and is lengthened by movement in the opposite direction.

14. In a motor vehicle, a frame, and a member disposed beneath the frame and movable with relation thereto, a wheel support associated with said member, a yieldable extension device supported on the member and extending upwardly therefrom and comprising two inflatable elements which comprise the sole load supporting connection between the frame and member, and means for connecting the upper end of the suspension device to the frame, and mechanism associated with said means for progressively increasing the resistance to the recoil movement of said device.

15. In a motor vehicle, a load supporting pneumatic suspension device and means for connecting the device at spaced points to a vehicle, said means including mechanism for progressively increasing the resistance to the recoil movement of said device, and said suspension device comprising two inflatable superimposed elements which operate to support the entire load.

16. In a motor vehicle, a frame, a wheel, a lever pivoted to the frame, a yieldable device for suspending the frame with reference to the wheel, a seat for the device carried by the lever intermediate the ends thereof, a non-rotatable support for the wheel, a link connecting the wheel support to the lever, and mechanism associated with the link for progressively increasing the resistance to the recoil movement of said device.

ALBERT E. FORSYTH.